United States Patent [19]

Schroeder

[11] Patent Number: 4,671,106
[45] Date of Patent: Jun. 9, 1987

[54] FUEL ENERGY QUANTIFICATION SYSTEM

[75] Inventor: Paul K. Schroeder, Cedar Rapids, Iowa

[73] Assignee: Rockwell International Corporation, El Segundo, Calif.

[21] Appl. No.: 807,140

[22] Filed: Dec. 10, 1985

[51] Int. Cl.<sup>4</sup> ........................................... G01M 15/00
[52] U.S. Cl. ..................... 73/117.3; 73/438
[58] Field of Search ............... 73/119 A, 438, 113, 73/114, 117.3

[56] References Cited

U.S. PATENT DOCUMENTS

| | | | |
|---|---|---|---|
| 3,182,510 | 5/1965 | Melchior | 73/438 |
| 4,134,301 | 1/1979 | Erwin, Jr. | 73/119 A X |
| 4,252,097 | 2/1981 | Hartford et al. | 73/438 X |
| 4,592,323 | 6/1986 | Vest | 123/198 DB X |

Primary Examiner—Jerry W. Myracle
Attorney, Agent, or Firm—Robert C. Mayes; George A. Montanye; H. Fredrick Hamann

[57] ABSTRACT

A fuel energy analysis system is disclosed utilizing a first hydrostatic sensor, calibrated to specific fuel tank geometries, to monitor fuel quantity; and an additional hydrostatic sensor located at a different geometric height from said first sensor, allowing determination of specific gravity through hydrostatic pressure, and thereafter computation of energy content as a function of mass. This system is particularly suitable for harsh environments such as vehicular applications wherein the quality of fuel input to a tank may frequently vary, and is readily corrected for fluid motion in the tank, by the addition of additional sensors in conjunction with baffles.

9 Claims, 5 Drawing Figures

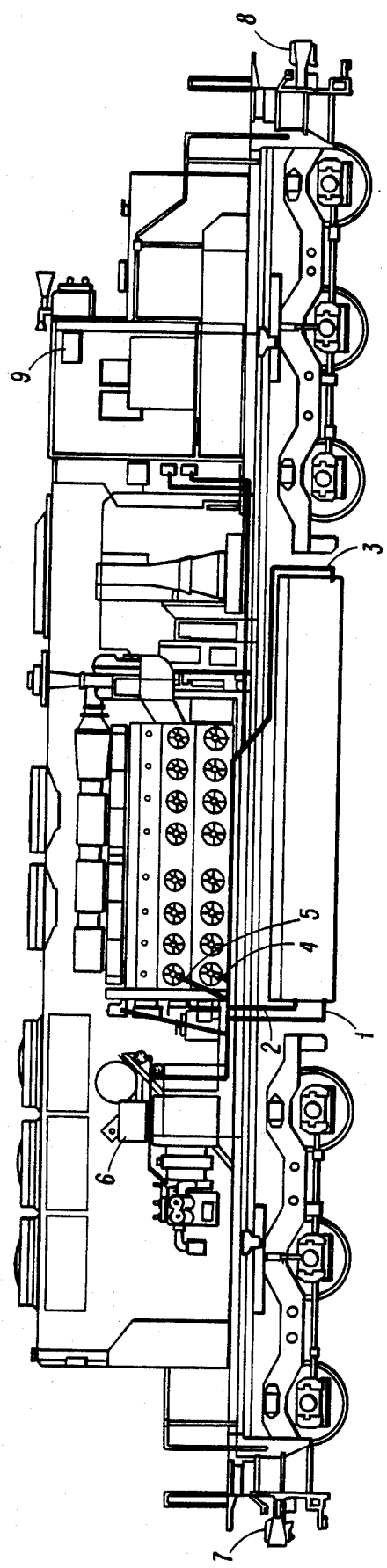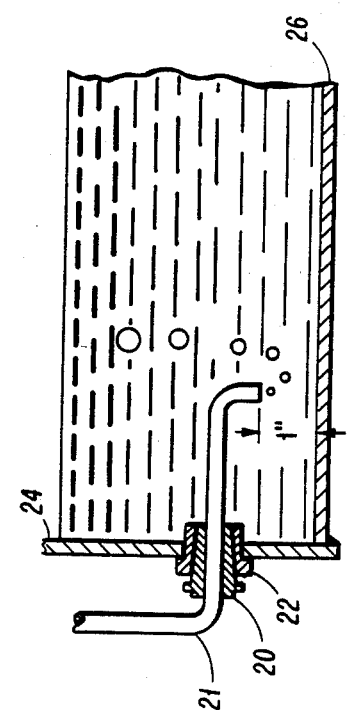
FIG 1
FIG 2

FUEL ENERGY QUANTIFICATION SYSTEM

BACKGROUND OF THE INVENTION

This invention relates to electromechanical apparatus adapted for sensing fuel levels and energy content of those fuels in a fuel container.

Conventionl fuel level sensors and systems typically utilize a float device or other surface level detecting scheme to provide information on the quantity of fuel in a container.

A novel approach utilizing a rate of pressure change in air above the surface of a liquid has been described in the Winter 1985 issue of NASA Tech Briefs, and is used to measure the volume of air of the surface, thereby providing information from which the volume occupied by the fuel may be readily calculated.

A significant drawback in all known prior systems and sensors is the limitation to volume determination. The actual energy content of the fuel has been typically computed on a per/unit volume basis, with the assumption inherent therein that the energy content per unit volume remains substantially constant.

A significant problem results in the environment where fuels of differing quality are regularly introduced into the fuel container, thereby substantially decreasing the accuracy of all fuel efficiency data based on volume. Additional secondary problems result from inaccurate fuel efficiency determinations such as cost per mile, in vehicular applications, difficulty in projecting the most cost effective and therefore fuel efficeint speed over varying terrain, and general cost control measures.

Accordingly, it is an object of the present invention to provide a fuel quantification system capable of determining both volume and quality with respect to fuel energy per unit volume.

Another object of the present invention is to provide a fluid measurement system capable of determining the specific gravity of a fluid in a tank, thereby allowing computation of energy content.

Briefly, and in accordance with the present invention, a fuel analysis system for a fuel container comprises at least two hydrostatic sensor means, each for providing a pressure output, a first output directly related to fuel quantity, and both sensors cooperatively providing outputs related to specific gravity of said fuel. The pressure diffference between first and second sensors constitutes a hydrostatic difference, with one sensor mounted at a higher gravitational potential that the other, which can be utilized in accordance with the present invention to ascertain specific gravity of the fuel. Thereafter, the specific gravity is computed either from a look-up table or directly through an analog process to cetane index. This provides a close approximation of the energy content of the fuel, as well as the quantity of the fuel in the tank.

These and other objects of the invention will become readily apparent upon reference to the following detailed description in conjunction with the drawings in which:

BRIEF DESCRIPTION OF THE DRAWINGS

FIG. 1 is a drawing of a diesel electric locomotive showing the present invention installed therein.

FIG. 2 is a cross-sectional view of one embodiment of a sensor coupling installed in a fuel tank.

DETAILED DESCRIPTION

Figure 3:
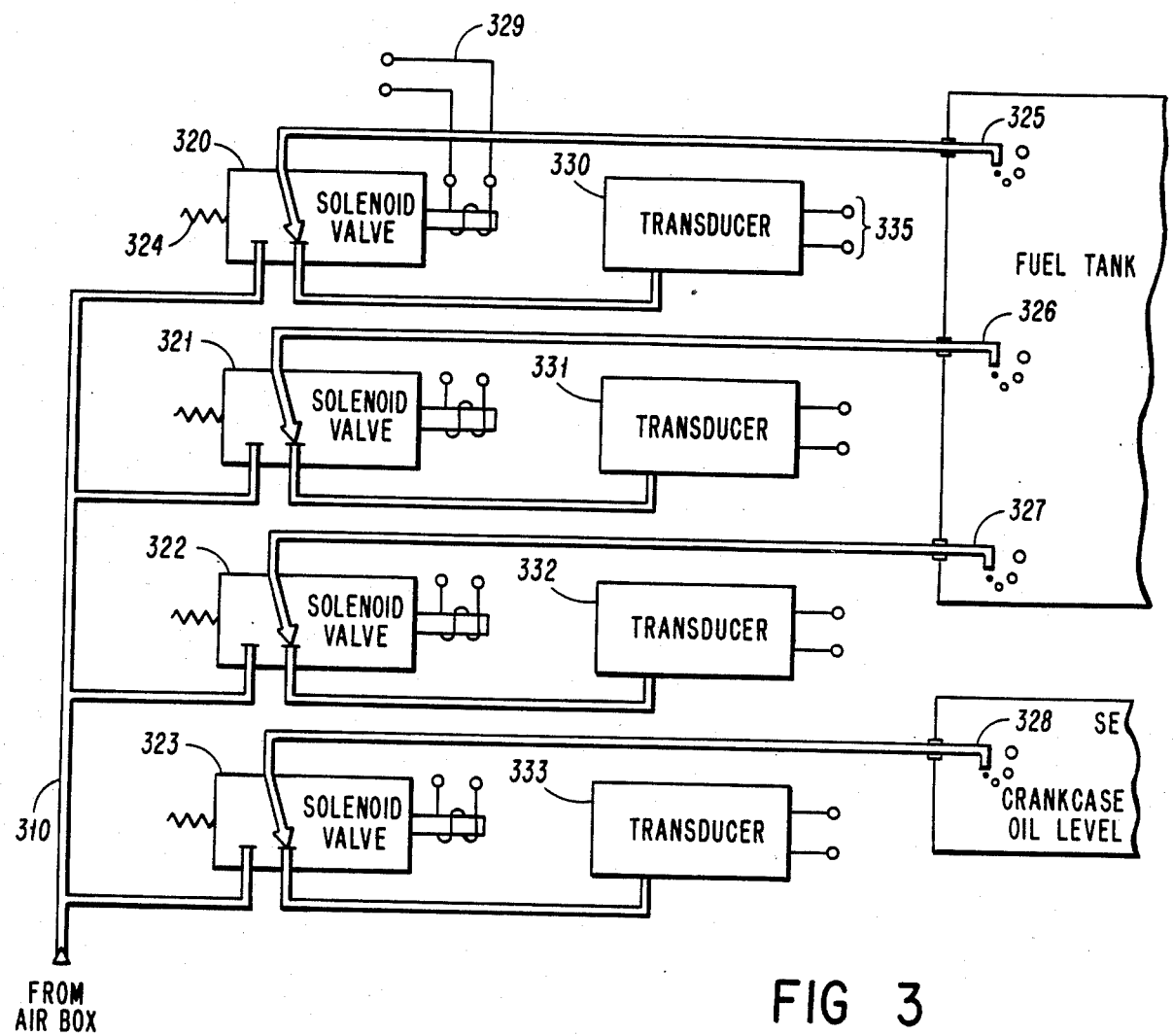
FIG. 3 is a block diagram of one embodiment of the present invention showing the relative electrical and air passage relationships.

Referring now to FIG. 1, a diesel electric locomotive showing the present invention installed therein is shown with the major components of the presently-invented system in proper relative positions.

The sensors 1, 2, and 3 are coupled to the fuel tank with air lines routed to the air manifold box 6. Additionally, fuel sensors 4, 5 for lubricating oil level determination are also routed to the air manifold box 6. Additional drawbar sensors 7, 8 are also coupled, in this exemary embodiment, to the control computer and display 9 for interface with the locomotive engineer for ready indication of output horsepower to the load.

Referring now to FIG. 2, a cross-sectional view of one embodiment of a sensor coupling installed in a fuel tank is shown with the air line 21 passing into tank 24 through compressive fittings 20, 22. The termination of the air line is preferrably in a downward direction, preventing the settlement of fuel contaminants in the air opening.

The use of compressive fittings 20 and 22 is preferrd to preclude the necessity for tapping the tank wall 24. Furthermore, approximately one inch clearance from the downward facing opening of the air line 21 was found to maintain apropriate accuracy on fuel quantity (on the lower sensor air coupling) without providing undue restriction due to build-up of sediments and particulate contamination in the fuel tank.

Referring now to FIG. 3, a block diagram of one embodiment of the air manifold showing the relative electrical and air passage relationships shows air lines 325, 326, 327 terminating in a fuel tank and each coupled to their respective solenoid valves 320-322, and selectively coupled to transducers 330-332, respectively. An additional crankcase oil level sensor termination 328 is provided with a similar solenoid valve 323 system for coupling to its transducer 333. As utilized in the present embodiment, the solenoid valves 320-323 are used to provide a switched air source from the air box 310 to periodically "blow" the sensor termination and lines 325-328 free of contamination, and therefore solenoid valves 320-323 switch back to couple sensor terminations 325-328 to the respective transducers 330-333. As the oil or fuel, respectively, proceeds to flow into the air lines, the pressure in the transducers increases until the equilibrium with ambient air pressure is obtained. Thereafter the transducer is sampled to ascertain the difference betwen sensed pressure and ambient pressure. This difference is output to a computer (not shown) via lines 335 upon appropriate timing to avoid conflict with solenoid switching on line 329, also coupled to the computer.

Figure 4:
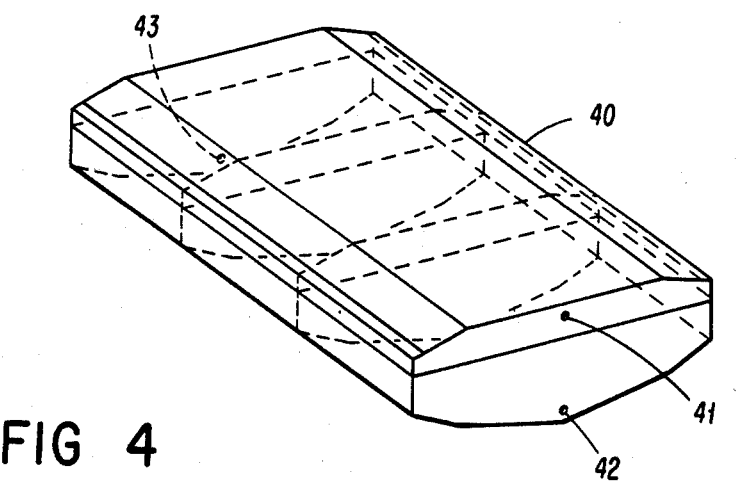
FIG. 4 is a perspective view of a typical fuel tank showing the proper location of the sensor couplings thereon.

Referring now to FIG. 4, the actual locations of the sensor terminations are shown on tank 40 wherein locations 42 and 43 are utilied to determine fuel quantities, irrespective of longitudinal position of the tank relative to the horizontal, and location 41 is utilized in combination with location 42, location 43 or the average of the two. It is important to note that utilizing a single quantative sensor location 41 requires that the air line termination be submerged for this process. This in turn requires the tank to be reasonably full to ascertain the cetane index, the fullness being a direct function of the location of the upper sensor termination. With transducers of a high precision, the respective locations may be closer and therefore the upper location 41 may be at the center of the tank or lower. In this manner, the difference between the hydrostatic pressure ascertained by the respective transducers from sensor location 42 and 41 constitutes a direct specific gravity output reading.

As is known in the art, there is a direct relationship between specific gravity and high and low heating values of typical diesel fuels, for example. This information, reproduced in the table below taken from Standard Practices for Stationary Diesel and Gasoline Engines (quoting the Bureau of Standards Miscellaneous Publication No. 97; Thermal Properties of Petroleum Products, Apr.28, 1933), is readily stored in a look-up table and additionally is readily corrected for temperature variations in the relationships.

TABLE 1

High and Low Heating Values of Some Typical Diesel Fuels

| Gravity °API | Sp. Gravity at 60° F. | Weight Fuel lbs/gal | High Heating Value | | Low Heating Value | |
|---|---|---|---|---|---|---|
| | | | Btu/lb | Btu/gal | Btu/lb | Btu/gal |
| 44 | 0.8063 | 6.713 | 19,860 | 133,500 | 18,600 | 125,000 |
| 42 | 0.8155 | 6.790 | 19,810 | 134,700 | 18,560 | 126,200 |
| 40 | 0.8251 | 6.870 | 19,750 | 135,800 | 18,510 | 127,300 |
| 38 | 0.8348 | 6.951 | 19,680 | 137,000 | 18,460 | 128,500 |
| 36 | 0.8448 | 7.034 | 19,620 | 138,200 | 18,410 | 129,700 |
| 34 | 0.8550 | 7.119 | 19,560 | 139,400 | 18,360 | 130,900 |
| 32 | 0.8654 | 7.206 | 19,490 | 140,600 | 18,310 | 132,100 |
| 30 | 0.8762 | 7.296 | 19,420 | 141,800 | 18,250 | 133,300 |
| 28 | 0.8871 | 7.387 | 19,350 | 143,100 | 18,190 | 134,600 |
| 26 | 0.8984 | 7.481 | 19,270 | 144,300 | 18,130 | 135,800 |
| 24 | 0.9100 | 7.578 | 19,190 | 145,600 | 18,070 | 137,100 |
| 22 | 0.9218 | 7.676 | 19,110 | 146,800 | 18,000 | 138,300 |
| 20 | 0.9340 | 7.778 | 19,020 | 148,100 | 17,930 | 139,600 |
| 18 | 0.9465 | 7.882 | 18,930 | 149,400 | 17,860 | 140,900 |
| 16 | 0.9593 | 7.989 | 18,840 | 150,700 | 17,790 | 142,300 |
| 14 | 0.9725 | 8.099 | 18,740 | 152,000 | 17,710 | 143,600 |
| 12 | 0.9861 | 8.212 | 18,640 | 153,300 | 17,620 | 144,900 |
| 10 | 1.0000 | 8.328 | 18,540 | 154,600 | 17,540 | 146,200 |

It should be noted that the relationships to cetane index are approximate; however, the use of these approximate energy values utilizing specific gravity as an entering variable for the data table provides a reasonably accurate tool in effectively assessing the energy input to the locomotive system, in this exemplary embodiment, with minor corrections as are known in the art.

Furthermore, the use of strain sensors in the drawbars of the locomotive in combination with the novel fuel quantification aspects of the present invention constitute an effective dynamometer for assessing present energy conversion and therefore maintenance control as well as operational control in an improved fuel efficient manner.

Figure 5:
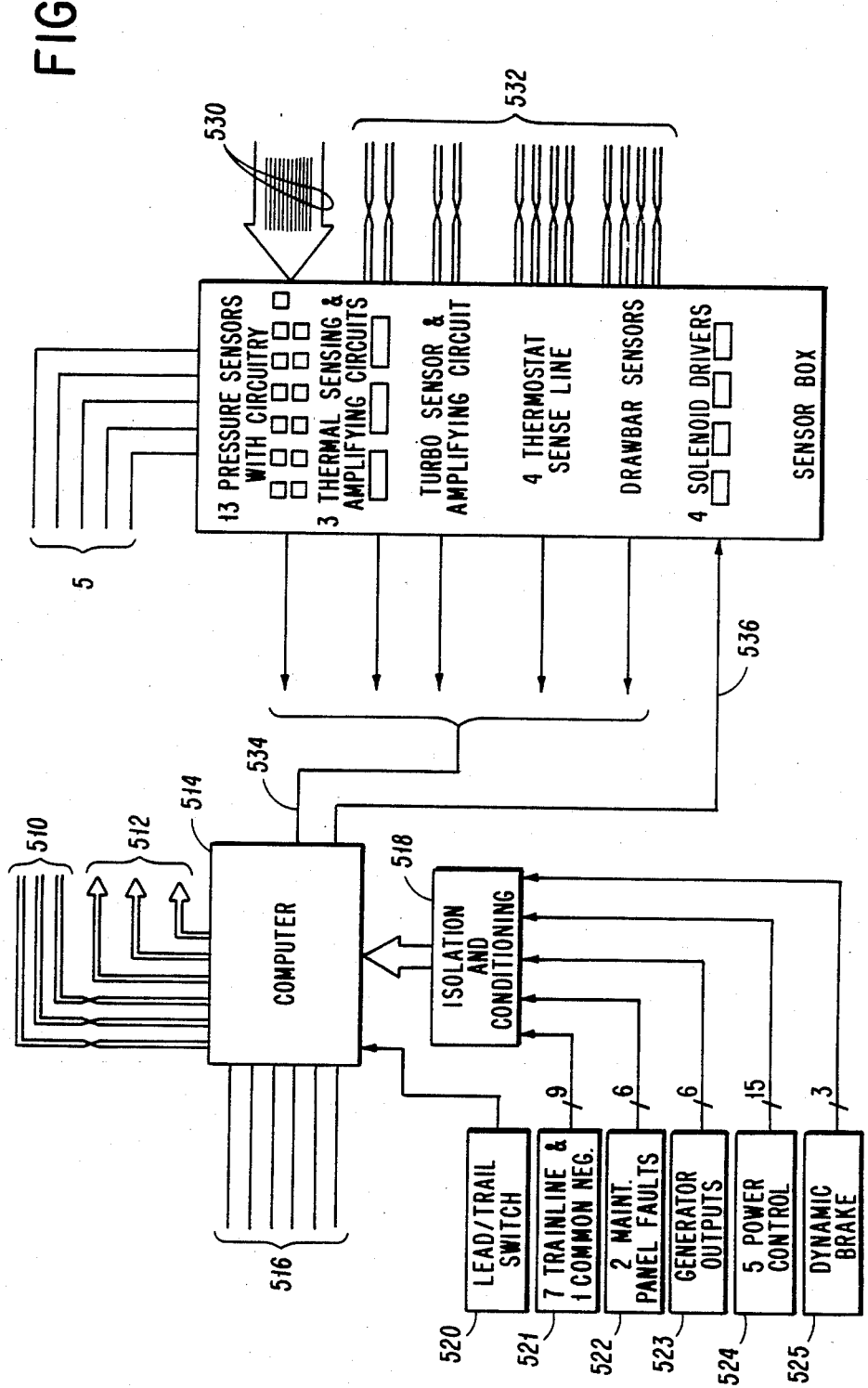
FIG. 5 is a block diagram showing the relationships of the analog interface for an exemplary vehicle coupled to a computer for proper monitoring of the sensed data.

Referring now to FIG. 5, a block diagram, the relationsip of the analog interface for the exemplary locomotive are shown coupled to a computer for proper monitoring of the sensed data. The solenoid and transducer circuits of FIG. 3 are contained within the sensor box with the air line inputs 130 providing the air input to the sensor box. Inputs 532 are coupled to various additional parameters such as turbo sensor and amlifying circuit, thermostats, and drawbar sensors, which are all input on bus 534 to the computer 514. Power and reference signals are provided to the sensor box on lines 531. The solenoid driver circuits 536 from the computer to the sensor box control the air purge cycle in response to the computer and additional signal inputs 520-525 are provided through isolation and conditioning circuitry 518 to the computer 514 for processing. The computer additionally is capable of receiving discrete inputs 510 and analog inputs 516, process data in accordance with programming requirements of a specific computer unit, and outputs the data on buses 512 to a display unit for operator interface, a storage medium maintaining a chronological record of desired operational parameters, or a data link/rdio unit for offloading data to a central control facility.

The accuracy of one embodiment was observed to measure volume accurately to within ±1% of full scale. This precision readily lends the invention to use as a calibration tool for totalizer and other fuel measurement systems.

While this invention has been described with respect to a specific railroad implementation, the novel and unobvious aspects of the present invention may readily be adapted to other fuel qualification requirements such as stationary power generation plants and others upon reading the specification in conjunction with the drawings. Accordingly, I wish to to be limited only by the claims hereinbelow, wherein:

I claim:

1. An improved energy management system comprising:
   a. a liquid fuel container;
   b. at least two pressure sensors coupled to said container; and
   c. means for computing, coupled to said at least two sensors, both the fuel quantity and approximate energy content of each unit quantity of said fuel as a function of said measured pressure.

2. An apparatus energy content of fuel comprising:
   a. means for containing a fuel quantity;
   b. means for sensing gravitational force per unit mass of said fuel, fixed at two locations on said means for containing, said two locations having different fixed geometric heights, one from the other thereby indicating hydrostatic difference in sensed force; and
   c. means, coupled to said sensors, for computing the specific gravity of said fuel as a function of said differenece in said sensed force, for relating said specific gravity to energy content of said fuel, and for finding the level of the fuel.

3. An apparatus as in claim 2 further comprising additional parameter sensors, at least one said additional sensor for detecting lubricating fluid level, coupled to said means for computing.

4. An apparatus as in claim 3 further comprising a real-time display output means, in human readable format, for improving operator perception of at least a portion of said parameters.

5. An apparatus as in claim 3 further comprising means for storage of said parameters as data and for subsequent transmission of said data.

6. An apparatus as in claim 5 wherein said means for sensing gravitational force per unit mass of said fuel further comprises a first air line, utilizing a compressive fitting, which is associated with a pressure sensing device, and a second air line utilizing a compressive fitting, which is associated with a second pressure sensing device.

7. An apparatus of claim 6 wherein said means for computing the specific gravity of said fuel comprises an ambient temperature and pressure sensing means.

8. An apparatus for measuring energy content of a fuel comprising:
 a. means for containing a fuel quantity;
 b. means for sensing gravitational force per unit mass of said fuel, at two locations on said means for containing, said two locations having differing geometric heights, one from the other, thereby indicating hydrostatic difference in sensed force;
 c. means, coupled to said means for sensing, for computing the specific gravity of said fuel as a function of said difference in said sensed force, and for relating said specific gravity to said energy content of said fuel;
 d. additional parameter sensors, at least one said additional sensor for detecting lubricating fluid level, coupled to said means for computing;
 e. means for storage of said parameters as data and for subsequent transmission of said data;
 f. a first air line, utilizing a compressive fitting, associated with a pressure sensing device; and
 g. a second air line, utilizing a compressive fitting, which is associated with a second pressure sensing device.

9. An apparatus as in claim 8 wherein said means for computing the specific gravity of said fuel comprised an ambient temperature and pressure sensing means.

* * * * *